United States Patent
Frolik et al.

(10) Patent No.: US 9,418,562 B2
(45) Date of Patent: Aug. 16, 2016

(54) ONBOARD WEATHER RADAR FLIGHT STRATEGY SYSTEM WITH BANDWIDTH MANAGEMENT

(71) Applicant: Honeywell International Sàrl, Rolle (CH)

(72) Inventors: Petr Frolik, Prague (CZ); Michal Knotek, Brno (CZ)

(73) Assignee: Honeywell International Sàrl, Rolle (CH)

( * ) Notice: Subject to any disclaimer, the term of this patent is extended or adjusted under 35 U.S.C. 154(b) by 74 days.

(21) Appl. No.: 14/261,177

(22) Filed: Apr. 24, 2014

(65) Prior Publication Data
US 2015/0310747 A1    Oct. 29, 2015

(51) Int. Cl.
| | |
|---|---|
| G08G 5/00 | (2006.01) |
| G01S 7/00 | (2006.01) |
| G01S 7/20 | (2006.01) |
| G01S 13/87 | (2006.01) |
| G01S 13/95 | (2006.01) |
| B64D 45/00 | (2006.01) |

(52) U.S. Cl.
CPC .............. *G08G 5/0091* (2013.01); *B64D 45/00* (2013.01); *G01S 7/003* (2013.01); *G01S 7/20* (2013.01); *G01S 13/87* (2013.01); *G01S 13/953* (2013.01)

(58) Field of Classification Search
CPC .. G08G 5/0091; B64D 45/00; H04B 7/18506; H04B 1/18539; H04B 1/18543; H04W 84/06; H04L 5/0064
See application file for complete search history.

(56) References Cited

U.S. PATENT DOCUMENTS

| | | | |
|---|---|---|---|
| 5,265,024 A | 11/1993 | Crabill et al. | |
| 6,014,606 A | 1/2000 | Tu | |
| 6,043,756 A | 3/2000 | Bateman et al. | |
| 6,501,392 B2 * | 12/2002 | Gremmert et al. | 340/971 |
| 8,437,893 B2 | 5/2013 | Mead et al. | |
| 8,604,963 B1 | 12/2013 | Kronfeld et al. | |

(Continued)

FOREIGN PATENT DOCUMENTS

| | | |
|---|---|---|
| EP | 2096470 A1 | 9/2009 |
| EP | 2157454 A2 | 2/2010 |

OTHER PUBLICATIONS

Gerz, T. et al., "5.2 Situational Awareness about Thunderstorms On-board an Aircraft," Final Report, DLR Project, Wetter & Fliegen, Jul. 12, 2012, 8 pp.

(Continued)

*Primary Examiner* — Brian Zimmerman
*Assistant Examiner* — Sara Samson
(74) *Attorney, Agent, or Firm* — Shumaker & Sieffert, P.A.

(57) ABSTRACT

This disclosure is directed to devices, systems, and methods for enabling and operating an onboard weather display system with managed bandwidth. In one example, a method includes receiving, by a hub system, initial sets of data from one or more aircraft. The method further includes receiving secondary sets of data from the aircraft, wherein the secondary sets of data are related to a significant weather condition. The method further includes transmitting an initial data stream to a particular aircraft, wherein the initial data stream is based at least in part on the initial sets of data from the one or more aircraft. The method further includes transmitting, in response to a request from the particular aircraft, a secondary data stream based at least in part on the secondary sets of data related to the significant weather condition.

22 Claims, 5 Drawing Sheets

(56) References Cited

U.S. PATENT DOCUMENTS

2005/0278120 A1   12/2005   Manfred et al.
2009/0012663 A1   1/2009    Mead et al.
2009/0219197 A1*  9/2009    Bunch .......................... 342/26 B

OTHER PUBLICATIONS

Trescott, M. et al., "General Aviation Pilot's Guide to Preflight Weather Planning, Weather Self-Briefings, and Weather Decision Making," Federal Aviation Administration, Dec. 27, 2009. 37 pp.

Stough. H.P, III et al., "New Technologies for Reducing Aviation Weather-Related Accidents," NASA, 2006, retrieved from http://ntrs.nasa.gov/archive/nasa/casi.ntrs.nasa.gov/20060048302.pdf on Mar. 4, 2014, 10 pp.

Extended Search Report from counterpart European Application No. 15162823.7, dated Sep. 4, 2015, 8 pp.

Response to Communication pursuant to Rules 70(2) and 70a(2) dated Nov. 2, 2015, from counterpart European Application No. 15162823.7, filed Apr. 27, 2016, 20 pp.

* cited by examiner

ONBOARD WEATHER RADAR FLIGHT STRATEGY SYSTEM WITH BANDWIDTH MANAGEMENT

This disclosure relates to weather radar systems.

BACKGROUND

An aircraft may use an onboard weather radar system to detect adverse weather conditions, which may enable the flight crew to make changes to the flight plan as necessary to avoid potentially hazardous weather. An aircraft in flight may also receive weather information from ground stations. Up-to-date weather information may assist the flight crew in evaluating whether or how to modify a flight plan to ensure safety of the flight.

SUMMARY

This disclosure is directed to systems, devices, and methods for enabling and operating an onboard weather radar system that may provide high-resolution graphical display of significant weather conditions to assist pilots in flight while managing bandwidth and maintaining moderate data transmission rates. In addition, the disclosure is directed to systems, devices, and methods for generating and providing weather information to one or more aircraft. A ground station may combine substantial numbers and variety of weather-sensing technologies from sensors based on one or more sources to enable high-range, high-resolution, three-dimensional, near-real-time graphical display of weather conditions. The one or more sources may include, for example, one or more other aircraft in flight, one or more ground-based weather radar stations, one or more weather satellites, or any combination thereof. This advanced graphical display of weather conditions may aid pilots substantially in avoiding hazardous weather and improving flight safety.

This advanced high-range, high-resolution, three-dimensional, near-real-time graphical display of weather conditions may also involve very high volumes of data. Transmitting the full volume of this data constantly to an aircraft may require very high bandwidth that may impose substantial burdens on aircraft system resources. Examples of this disclosure may enable management of the bandwidth required for data transmission for high-range, high-resolution, three-dimensional, near-real-time graphical display of weather conditions. Examples of this disclosure may involve defaulting in normal weather conditions to throttled bandwidth and transmitting selected portions of data to enable graphical weather display that is informative without taking full advantage of the system's capabilities, while providing the pilot with an option to invoke the high-bandwidth transmissions for higher range, resolution, frame rate, and dimension (2D to 3D), as needed, for displaying and helping the pilot understand hazardous weather conditions when they arise, and for transmitting additional volumes of data when it detects a potentially hazardous weather system.

In one example, a method for enabling an onboard weather display system includes receiving, by a hub system, one or more initial sets of data from one or more aircraft. The method further includes receiving, by the hub system, one or more secondary sets of data from one or more of the aircraft, wherein the one or more secondary sets of data are related to a significant weather condition detected by the one or more of the aircraft. The method further includes transmitting, by the hub system, an initial data stream to a particular aircraft, wherein the initial data stream is based at least in part on the one or more initial sets of data from the one or more aircraft. The method further includes transmitting, by the hub system in response to a request from the particular aircraft, a secondary data stream to the particular aircraft, wherein the secondary data stream is based at least in part on the one or more secondary sets of data related to the significant weather condition.

Another example is directed to an article of manufacture that includes a computer-readable medium having program code stored thereon, configured to be executable by one or more processors. The program code is configured for causing the one or more processors to receive one or more initial sets of data from one or more aircraft. The program code is further configured for causing the one or more processors to receive one or more secondary sets of data from one or more of the aircraft, wherein the one or more secondary sets of data are related to a significant weather condition detected by the one or more of the aircraft. The program code is further configured for causing the one or more processors to generate an initial data stream for transmission to a particular aircraft, wherein the initial data stream is based at least in part on the one or more initial sets of data from the one or more aircraft. The program code is further configured for causing the one or more processors to generate, in response to a request from the particular aircraft, a secondary data stream for transmission to the particular aircraft, wherein the secondary data stream is based at least in part on the one or more secondary sets of data related to the significant weather condition.

Another example is directed to a system for operating an onboard weather display system on an aircraft. The system is configured to receive an initial data stream based at least in part on one or more initial sets of data from one or more additional aircraft. The system is further configured to transmit a request to a hub system for a secondary data stream comprising additional data associated with a significant weather condition indicated by the initial data stream. The system is further configured to receive the secondary data stream, wherein the secondary data stream comprises additional data not comprised in the initial data stream. The system is further configured to generate a display based at least in part on the secondary data stream.

Another example is directed to a hub system configured to enable an onboard weather display system on an aircraft. The hub system includes means for receiving one or more initial sets of data from one or more aircraft. The hub system further includes means for receiving one or more secondary sets of data from one or more of the aircraft, wherein the one or more secondary sets of data are related to a significant weather condition detected by the one or more of the aircraft. The hub system further includes means for transmitting an initial data stream to a particular aircraft, wherein the initial data stream is based at least in part on the one or more initial sets of data from the one or more aircraft. The hub system further includes means for transmitting, in response to a request from the particular aircraft, a secondary data stream to the particular aircraft, wherein the secondary data stream is based at least in part on the one or more secondary sets of data related to the significant weather condition.

The details of one or more examples are set forth in the accompanying drawings and the description below. Other features, objects, and advantages will be apparent from the description and drawings, and from the claims.

DETAILED DESCRIPTION

Various examples described below generally directed to devices, systems, techniques, and methods for enabling and operating an onboard weather display system with managed bandwidth between a hub system and an aircraft (which may be in flight). In some examples, one or more aircraft may transmit initial sets of data to be received by the hub system. When one or more of the aircraft detect a significant weather condition that may be potentially hazardous to an aircraft in flight, such as turbulence, convective cells, high winds, hail, lightning, or storms, the one or more aircraft may transmit secondary sets of data related to the significant weather condition, to be received by the hub system. The secondary sets of data may have higher bandwidth than the initial sets of data, to transmit higher amounts of data related to the significant weather condition.

The hub system is configured to transmit an initial data stream back to one or more particular aircraft, which may include one or more aircraft that has transmitted initial and/or secondary data sets to the hub system, or other aircraft. The initial data stream is based on the initial sets of data from the various aircraft. In some examples, a particular aircraft may transmit a request to the hub system for additional data related to a significant weather condition indicated by the initial data stream. The request may be generated by the crew of the aircraft, or automatically by an aircraft system.

The hub system may then transmit a secondary data stream to the particular aircraft, where the secondary data stream is based at least in part on the one or more secondary sets of data related to the significant weather condition. The secondary data stream may also be at a higher bandwidth, to transmit higher amounts of data related to the significant weather condition, which may be useful for high-resolution display of the significant weather condition. The high-resolution display of the significant weather condition may be useful for the crew in deciding if and when to modify their flight strategy, e.g., to avoid a detected weather hazard. The system may operate at higher bandwidth only when needed to deal with significant weather conditions, thereby promoting flight safety while making efficient use of communication resources.

Figure 1:
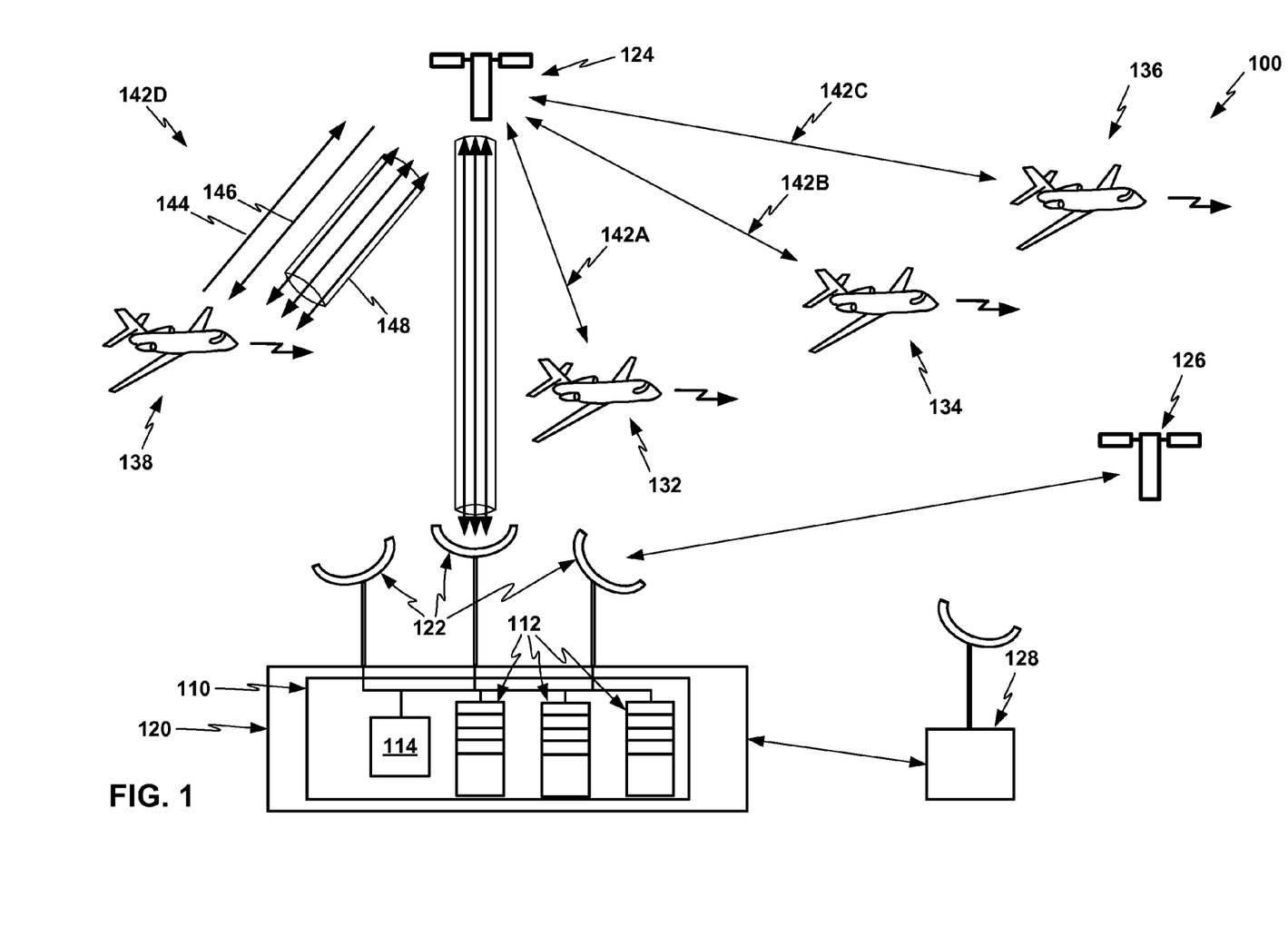
FIG. 1 depicts a conceptual diagram of an example weather information network system that includes a hub system in communication with a number of representative aircraft in flight.

FIG. 1 depicts a conceptual diagram of an example weather information network system 100 that includes a hub system 110 in communication with a number of representative aircraft 132, 134, 136, 138 in flight. Hub system 110 may be in communication with any number of aircraft in flight, in various examples. Hub system 110 is based at a ground station 120, in this example. Hub system 110 may enable methods and techniques for operating an onboard weather display system with managed bandwidth on aircraft 132, 134, 136, 138 in flight, as further described below.

Hub system 110 includes computing devices 112 and an interface device 114 in data communication with computing devices 112, in this example. Computing devices 112 may include one or more processors. The one or more processors, as well as other processors disclosed herein, can comprise any suitable arrangement of hardware, software, firmware, or any combination thereof, to perform the techniques attributed to hub system 110 described herein. For example, the one or more processors may include any one or more microprocessors, digital signal processors (DSPs), application specific integrated circuits (ASICs), field programmable gate arrays (FPGAs), or any other equivalent integrated or discrete logic circuitry, as well as any combinations of such components. Hub system 110 may also include a memory (e.g., as part of one or more computing devices 112), which can include any volatile or non-volatile media, such as a RAM, ROM, non-volatile RAM (NVRAM), electrically erasable programmable ROM (EEPROM), flash memory, and the like. The memory may store computer readable instructions that, when executed by the one or more processors of system 110 cause the processors to implement the techniques attributed to system 110 herein.

Hub system 110 is also in data communication with communication antennas 122 of ground station 120, and thereby in communication via telecommunication satellite 124 with aircraft 132, 134, 136, 138. In particular, hub system 110 has a broadband data connection 140 with telecommunication satellite 124, and telecommunication satellite 124 has satellite-aircraft data links 142A, 142B, 142C, 142D, respectively ("satellite-aircraft data links 142") with each of aircraft 132, 134, 136, 138 in flight.

Each of satellite-aircraft data links 142 may be at a standard or nominal bandwidth at some intervals of time, and have its bandwidth increased to a broadband connection at some intervals of time (with the understanding that "standard bandwidth" and "broadband" may be defined differently in various applications, some examples of which are discussed below). This is shown in the example of satellite-aircraft data link 142D with aircraft 138. In the example shown in FIG. 1, satellite-aircraft data link 142D includes a standard-bandwidth downlink channel 144, a standard-bandwidth uplink channel 146, and a broadband connection 148, any of which may only be operative at certain intervals of time. In general, broadband connection 148 may enable a substantially higher rate of data download and/or upload between aircraft 138 and hub station 110 than is possible with standard channels 144 and 146, while broadband connection 148 may also consume a higher level of resources, impose higher operational burden, or be more expensive than standard channels 144 and 146.

Each of aircraft 132, 134, 136, 138 may employ sensors in flight, including an onboard weather radar system (with onboard radar transmissions conceptually depicted in FIG. 1) and/or other sensors that collect data relevant to weather conditions. Each of aircraft 132, 134, 136, 138 may transmit data on a recurring basis to hub system 110. For example, each of aircraft 132, 134, 136, 138 may transmit basic sets of data to hub system 110 on an ongoing basis during flight, where the basic sets of data may include sensor data, sensor range setting data, sensor angle setting data, aircraft position data, aircraft heading data, aircraft speed data, and aircraft altitude data. Each of aircraft 132, 134, 136, 138 may transmit the basic sets of data to hub system 110 via the respective standard-bandwidth downlink channel 144. The aircraft 132, 134, 136, 138 may transmit the basic sets of data to hub system 110 via other means, either via satellite 124 or other asset or directly to hub system 110, in other examples.

The sensor data may include selected portions of data from an onboard weather radar and/or other onboard sensors. The data from the onboard weather radar may include radar imaging data, as well as sensor setting data such as radar range setting data and radar angle setting data, for example. The sensor data may include all of the data from the onboard weather radar and/or other onboard sensors at certain times, in some examples. The sensor range setting data and sensor angle setting data may include data on settings for the range and angle of the onboard weather radar and/or other onboard sensors. The aircraft position data and aircraft altitude data may include data on the position, altitude, heading, speed, and/or other related parameters of the aircraft. Therefore, hub system 110 may receive one or more initial sets of data from one or more of aircraft 132, 134, 136, 138, where receiving the initial sets of data may include hub system 110 receiving one or more of sensor data, sensor range setting data, sensor angle setting data, aircraft position data, aircraft heading data, aircraft speed data, and aircraft altitude data, from one or more of aircraft 132, 134, 136, 138. In some examples, each initial set of data can also include timestamp data to indicate one or more times at which the data was generated by the aircraft.

Hub system 110 may process the initial sets of data from one or more of aircraft 132, 134, 136, 138 to generate an initial data stream to transmit back to one or more of aircraft 132, 134, 136, 138. Generating the initial data stream may include processing the initial data sets, selecting data from among the initial data sets, combining data from the initial data sets, adding additional data (such as from other sources) besides the data from the initial data sets from the aircraft, and formatting the data to transmit to the aircraft, for example. Generating the initial data stream by hub system 110 may include only some of these processes and may include additional processes, in various examples. Hub system 110 may then transmit the initial data stream to aircraft 132, 134, 136, 138, or to any one particular aircraft among aircraft 132, 134, 136, 138. Hub system 110 may transmit the initial data stream to any number of aircraft in various examples. Hub system 110 may transmit any one or more of: sensor data, sensor range setting data, sensor angle setting data, aircraft position data, aircraft heading data, aircraft altitude data, and the respective timestamp data from any one or more of aircraft 132, 134, 136, 138 as part of the initial data stream.

Hub system 110 may transmit the initial data stream to aircraft 132, 134, 136, 138 via the respective standard channel 146, with a standard bandwidth for communications between an aircraft and a ground station. This standard bandwidth may use only a portion of the maximum bandwidth of the possible data link with which hub station 110 and a particular aircraft 138 are enabled for communicating data with each other. This standard bandwidth may be a relatively low bandwidth compared with the maximum bandwidth possible.

The initial data stream may indicate the absence or presence of a significant weather condition in the path of the particular aircraft 138. When the initial data stream shows that the weather in the flight path is relatively calm and clear, aircraft 138 may continue in flight and continue transmitting the initial data sets to hub system 110 and receiving the initial data stream from hub system 110 (or in some examples, aircraft 138 may not necessarily transmit initial data sets to hub system 110, but receive the initial data stream from hub system 110). When the initial data stream shows an indication of a significant weather condition potentially in the flight path of aircraft 138, aircraft 138 may respond by transmitting a request to hub system 110 for additional data related to the significant weather condition (e.g., one or more processors of a flight information system onboard the aircraft 138 may generate a request for transmission via an onboard communication antenna, as further described below with reference to flight information system 270 of FIG. 2).

The request from aircraft 138 may be generated by the crew of the aircraft, or automatically by an aircraft system. The request from aircraft 138 may be specifically a request for a secondary data stream comprising additional data associated with the significant weather condition, or may be interpreted by hub system 110 as a request for a secondary data stream comprising additional data associated with the significant weather condition, where the secondary data stream is based at least in part on the one or more secondary sets of data related to the significant weather condition as transmitted by one or more of the aircraft 132, 134, 136, 138 that have detected the significant weather condition.

In some examples, a significant weather condition potentially in the flight path of aircraft 138 may be detected by another one or more aircraft proximate to the flight path of aircraft 138. In one example, aircraft 132, 134, and 136 are proximate to the flight path of aircraft 138, and each of the aircraft 132, 134, and 136 detects a significant weather condition potentially in the flight path of aircraft 138. Aircraft 132, 134, and 136 transmit secondary sets of data related to the significant weather condition to hub system 110. The secondary sets of data include higher amounts of data than the initial sets of data, to characterize the significant weather condition with high resolution, and aircraft 132, 134, and 136 transmit the secondary sets of data at a higher bandwidth than the initial sets of data. Hub system 110 receives the secondary sets of data at a higher bandwidth than the initial sets of data.

Hub system 110 generates the secondary data stream based at least in part on the one or more secondary sets of data related to the significant weather condition, as received from aircraft 132, 134, and 136. Hub system 110 processes and combines the secondary sets of data related to the significant weather condition to generate the secondary data stream, as further described below. Hub system 110 then transmits the secondary data stream to aircraft 138 via broadband channel 148, at a higher bandwidth than the initial data stream via standard channel 146.

Hub system 110 may also be in data communication with representative weather satellite 126 and representative ground weather station 128, in this example. Hub system 110 may be in data communication with any number of weather satellites and/or ground weather stations, in various examples. Weather satellite 126 and/or ground weather station 128 may use radar, infrared, or any other active or passive sensing technologies to detect data relevant to weather, and transmit that data to hub system 110. In this example, hub system 110 receives additional data related to the significant weather condition from one or more additional sensor systems, such as weather satellite 126 and ground weather station 128, and generates the secondary data stream based at least in part on both the additional data related to the significant weather condition from weather satellite 126 and ground weather station 128, and the secondary sets of data received from aircraft 132, 134, and 136.

The secondary data sets and the secondary data stream may include additional types of data not included in the initial sets of data. For example, the secondary data sets may include full-resolution radar imaging data of the significant weather condition, and may include three-dimensional radar imaging data related to the significant weather condition. The three-dimensional radar imaging data may include, for example, radar reflectivity data in an earth-referenced three-dimensional (or "volumetric") memory buffer. The memory buffer may include the radar imaging data combined with sources of three-dimensional geographic and atmospheric data and sources of three-dimensional aircraft data on the aircraft's position, altitude, heading, and speed, for example. One or more processors onboard the aircraft may combine the three-dimensional radar imaging data, the geographic and atmospheric data, and the aircraft data to store in the memory buffer, and/or in other data storage. A radar system, e.g., onboard an aircraft, may be configured to scan the entire three-dimensional space in front of the aircraft, and the one or more processors may store the reflectivity data in the three-dimensional memory buffer. The one or more processors onboard the aircraft may update the memory buffer with newly obtained radar reflectivity data. The one or more processors may extract reflectivity data from the memory buffer to generate the desired weather information without having to make and wait for view-specific antenna scans. In addition, with the three-dimensional volumetric buffer data, the presentation of weather information is not constrained to a single tilt-plane that is inherent to conventional radar.

Hub system 110 may combine full-resolution radar imaging data from multiple aircraft 132, 134, 136 with additional weather radar data from ground-based weather radar station 128 and infrared imaging data from weather satellite 126 to generate high-resolution imaging data of the significant weather condition. The high-resolution imaging data of the significant weather condition in the secondary data stream generated by hub system 110 may enable more detailed image display of the significant weather condition, by aircraft 138 or another entity, than is possible through any single one of the sources of weather data from which hub system 110 gathers its data. The radar imaging data from any one of aircraft 132, 134, 136 by itself might only provide a limited view of the significant weather condition. The radar imaging data from ground-based weather radar station 128 may also only provide a limited view of the significant weather condition. The data from weather satellite 126 may only provide a top-down view of the significant weather condition.

The combined imaging data generated by hub system 110 for the secondary data stream may enable higher resolution imaging and display of the significant weather condition than would be possible through any of the individual sources of data. By combining data sources from many vantage points, including several positions over time of aircraft 132, 134, and 136 as they progress in their flight paths, as well as the ground-based positions of weather radar station 128 and the space-based vantage of weather satellite 126, the secondary data stream generated and transmitted by hub system 110 may enable high-resolution graphical display of the significant weather condition (e.g., above a selected resolution) by an aircraft system onboard aircraft 138 (as further described below with reference to FIG. 2). This high-resolution display of the significant weather condition may be enabled for display of a three-dimensional (3D) view of the significant weather condition. This high-resolution display of the significant weather condition may be enabled for a high resolution in time, such as a high frame rate (e.g., above a selected frame rate). In addition, or instead, this high-resolution display of the significant weather condition may also be enabled for a high range (e.g., above a selected distance threshold), particularly by combining the range of multiple sources of observation (e.g., aircraft, ground stations, satellites). The high-resolution display of the significant weather condition as provided via the secondary data stream from hub system 110 may serve as a valuable resource in assisting the crew of aircraft 138 in understanding the significant weather condition, and whether or how they should alter their flight strategy or flight plan to avoid the significant weather condition.

Hub system 110 may select from among the data it has available to it from its multiple data sources to include high-resolution data only that is relevant to or related to the significant weather condition, as part of generating the secondary data stream for transmitting to aircraft 138. For example, if aircraft 132 and 134 have both provided weather radar imaging data of the significant weather condition from close to the same position, direction, or perspective, much of their data may overlap, and hub system 110 may generate a combined data stream that removes duplicate information derived from the secondary data sets from aircraft 132 and 134. If aircraft 136 provides additional data related to the significant weather condition from a more distant position, such that its data is of relatively low resolution or of marginal value, hub system 110 may omit part or all of the secondary data sets from aircraft 136 in generating the secondary data streams to transmit to aircraft 138.

In another example, the request from aircraft 138 may include designations of particular aircraft as designated sources of data to be included in the secondary data stream requested by aircraft 138. Hub system 110 may receive a request from aircraft 138 that designates aircraft 132, 134, and 136 as sources of data to incorporate into the requested secondary data stream. In another example, the request from aircraft 138 may designate a certain flight path, or a nominal flight path and one or more optional flight paths (where the nominal flight path may be the originally filed or originally planned flight path), or a range of area, and hub system 110 may assemble data relevant to that designated one or more flight paths or designated area, as part of generating and transmitting the secondary data stream.

In some examples, the initial data sets, the secondary sets of data, or both, may be transmitted by hub system 110 to aircraft 138 under a subscriber agreement. Hub system 110 may interact with various aircraft based on service subscriptions with operators of the aircraft. Hub system 110 may use techniques to confirm a subscriber policy associated with a particular aircraft 138, and to establish high-bandwidth data link 148 with aircraft 138, prior to transmitting the secondary data stream to aircraft 138.

Figure 2:
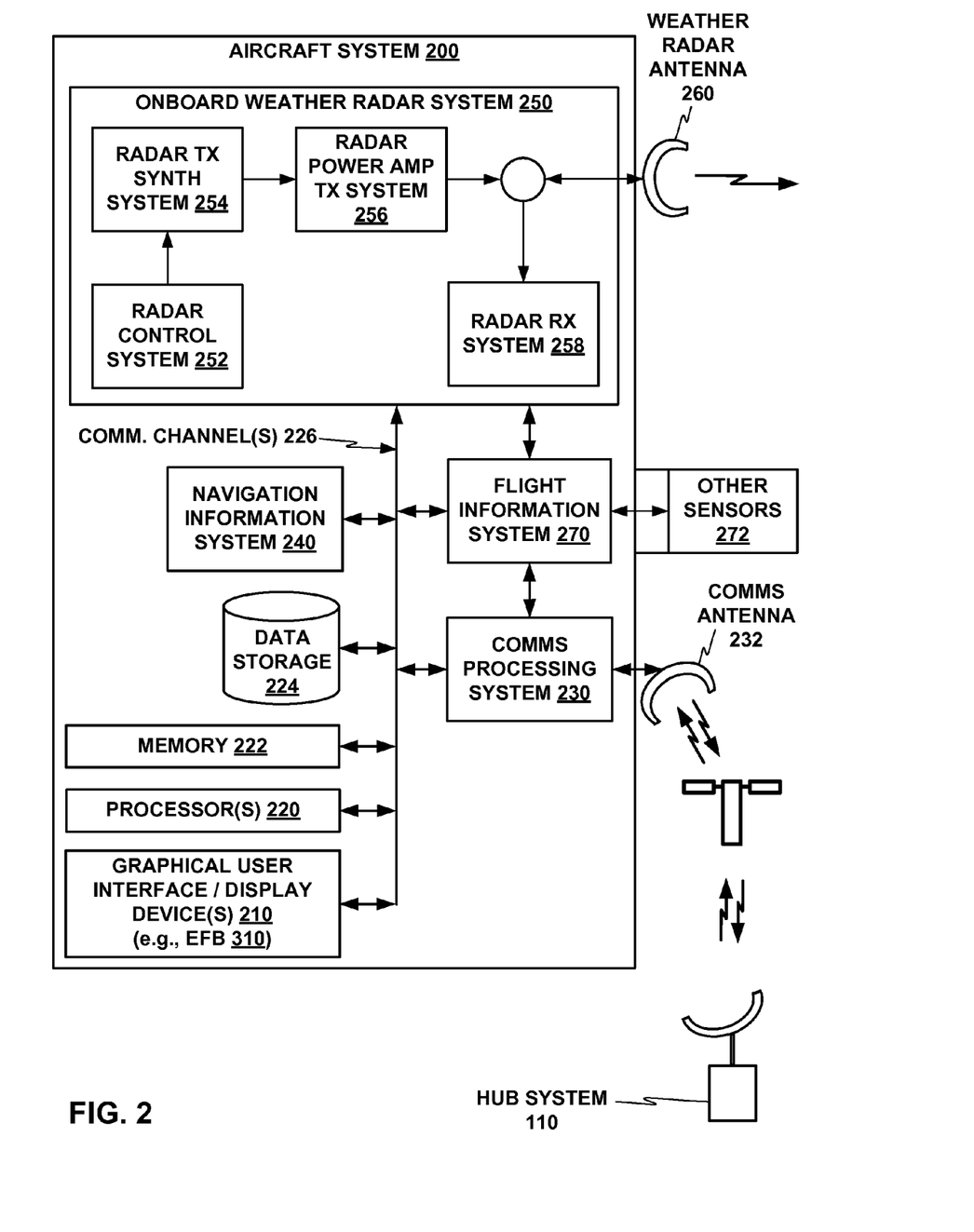
FIG. 2 depicts a functional block diagram of an example aircraft system that enables functions such as operating an onboard weather display system on an aircraft.
Figure 3:
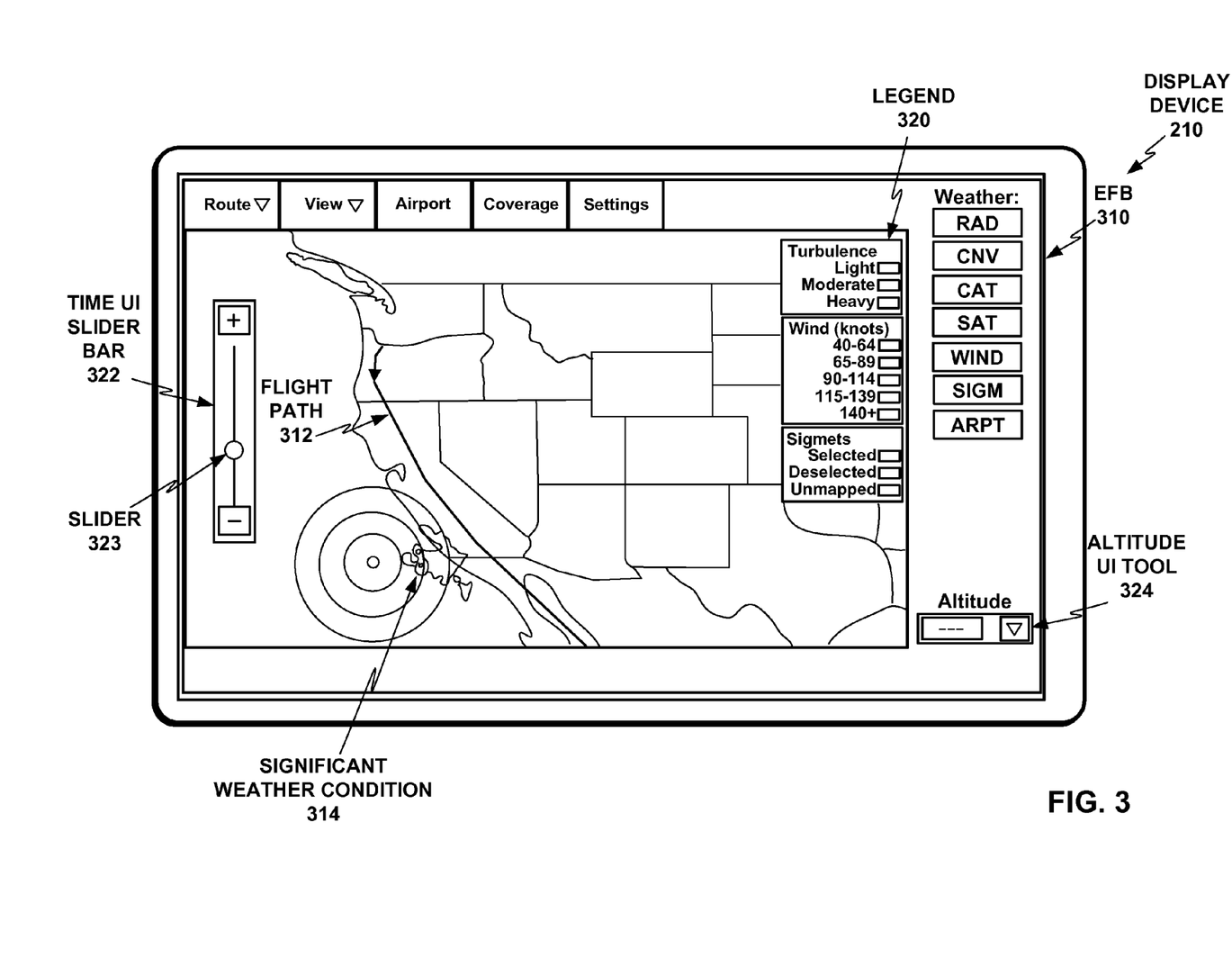
FIG. 3 depicts a conceptual diagram of graphical user interface/display device that incorporates an electronic flight bag (EFB) and that may be used on a particular aircraft in flight in various examples.

FIG. 2 depicts a functional block diagram of an example aircraft system 200 configured to operate an onboard weather display system on an aircraft, such as aircraft 138 of FIG. 1 as described above. Aircraft system 200 includes a graphical user interface/display device 210 ("display device 210"), which may take the form of an electronic flight bag (EFB) 310, that may generate and display graphical displays of maps of flight paths of aircraft 138, along with meteorological conditions in the range of a flight path. In other examples, display device 210 may be provided by a primary flight display (PFD), a multifunction display (MFD), a navigation display, or any other suitable display.

Aircraft system 200 includes one or more processor(s) 220, memory 222, and data storage 224, which are displayed separately from display device 210 in FIG. 2, and which may be incorporated as part of display device 210 in some examples.

Aircraft system 200 also includes communications processing system 230, communications antenna 232, navigation information system 240, onboard weather radar system 250, weather radar antenna 260, flight information system 270, other sensors 272, and onboard communication channels 226 enabling communicative connections among the various onboard systems. Flight information system 270 may include the features indicated above with reference to FIG. 1, including the one or more processors onboard aircraft 138. Onboard weather radar system 250 includes radar control system 252, radar transmitter synthesizer system 254, radar power amplification transmitter system 256, and radar receiver system 258. Onboard weather radar system 250 and weather radar antenna 260 may gather weather radar data for detecting, characterizing, and imaging weather systems, including significant weather conditions that may be hazardous to flight. Aircraft system 200 may transmit this weather radar data as part of initial data sets via communications antenna 232 via a standard channel to hub system 110. Aircraft system 200 may also transmit range and angle settings from onboard weather radar system 250, and data on the position, flight path, heading, and altitude of the aircraft from, e.g., navigation information system 240 and flight information system 270, and data from other sensors 272, to hub system 110 as part of the initial data sets.

The flight information system 270 onboard aircraft 138 may include, e.g., a flight management system (FMS), an air data computer (ADC), or any combination thereof. One or more processors of the flight information system onboard aircraft 138 may determine whether to send a request to hub system 110 for more detailed information about a significant weather condition based on the nominal flight path indicated by the FMS or the ADC, or one or more processors of the flight information system onboard aircraft 138 may provide information to the flight crew to assist them in evaluating whether to issue a request for more detailed information about a significant weather condition.

Navigation information system 240 may include, e.g., an Inertial Navigation System (INS), a Global Positioning System (GPS), or any combination thereof. Data storage 224 may include one or more hard disk drives, one or more flash drives, and/or one or more additional non-volatile or more or less long-term data storage devices. Memory 222 may include random access memory (RAM) integrated circuits, cache circuits, and/or one or more volatile or more or less short-term data storage devices. Data storage 224 and/or memory 222 may also include one or more devices or systems that may function or be used as either long-term data storage and/or short-term memory.

Aircraft system 200 may receive data from hub system 110, including standard (initial) data streams and high-bandwidth (secondary) data streams from hub system 110, via communications antenna 232 for display via display device 210. In response to receiving a high-bandwidth (secondary) data stream from hub system 110, aircraft system 200 may display a high-resolution graphical display of a significant weather condition proximate to the flight path of aircraft 138 based on the high-bandwidth (secondary) data stream from hub system 110, an example of which is shown in FIG. 3 and described below.

FIG. 3 depicts a conceptual diagram of graphical user interface/display device 210 ("display device 210") that incorporates an electronic flight bag (EFB) 310 and that may be used on a particular aircraft 138 in flight in various examples, such as aircraft 138 as depicted in FIG. 1. EFB 310 may be implemented as a hardware device, as software or an application executing on display device 210, or a combination of hardware and software. EFB 310 may serve various information collection and display functions useful for the crew of aircraft 138. In the example of FIG. 3, one or more processors 220 of aircraft system 200 of aircraft 138, receiving and transmitting data via communication processing system 230 and communication antenna 232, receives an initial data stream from hub system 110 indicating a significant weather condition, transmits a request to hub system 110 for additional high-bandwidth data on the significant weather condition, and receives a high-bandwidth secondary data stream from hub system 110. One or more processors 220 generate a map display output for EFB 310 to display a map showing a graphical depiction of flight path 312 of aircraft 138. EFB 310 may initially show a display of significant weather condition 314 in its position on the map based on the standard-bandwidth initial data stream from hub system 110. If aircraft 138 requests the high-bandwidth secondary data stream from hub system 110, EFB 310 may then shows a high-resolution graphical display of the significant weather condition 314 in its position on the map based on the high-bandwidth secondary data stream from hub system 110.

The flight crew of aircraft 138 and/or the one or more processors 220 of aircraft system 200 may include, in the request to hub system 110 for additional data, parameters defining the scope of what additional detailed data to transmit to aircraft 138. For example, the flight crew of aircraft 138 and/or one or more processors 220 of aircraft system 200 may define geographical parameters and/or a time frame to be covered by the additional data, or may designate specific other aircraft proximate to their flight path 312 from which to combine data, or may specify data relevant to nominal flight path 312 and/or the actual current position, heading, and speed of aircraft 138. The flight crew of aircraft 138 for purposes of this discussion may include personnel who are not necessarily physically present onboard aircraft 138 but who are supporting or controlling the flight of aircraft 138.

EFB 310 also includes a legend 320 showing color-coding correspondence interpreting the graphical displays of various levels of turbulence, wind speeds, and selected or de-selected significant weather conditions. EFB 310 also includes a graphical user interface (UI) element 322 with a "slider bar" form with a slider 323 corresponding to progression in time, such that a crew member may move the slider 323 along the slider bar of UI element 322 to control the display of the significant weather condition over time, based on data from different points in time included in the high-bandwidth secondary data stream from hub system 110. EFB 310 may continue to update the graphical display of the significant weather condition 314 over time as it continues to receive additional, updated data from hub system 110. Hub system 110 may transmit the secondary data stream in a format enabled for the high-resolution graphical display of the significant weather condition. This may include hub system 110 transmitting the secondary data stream in a format enabled for display of the significant weather condition at various points in time as determined by a position of a user input element.

EFB 310 also includes an altitude user interface (UI) tool 324 enabling the user to select an altitude setting to display the graphical display of the significant weather condition significant weather condition 314. Altitude UI tool 324 may assist the crew in evaluating how the significant weather condition varies over altitude and whether or how an altitude change in the flight path might help in avoiding the significant weather condition.

In various examples, EFB 310 may show a high-resolution, three-dimensional graphical display of the significant weather condition and its environment and how they might affect the flight path 312 of the aircraft 138, or a vertical situational display of the flight path 312 of aircraft 138 and the weather proximate aircraft 138, e.g., along the flight path 312. The three-dimensional graphical display of the significant weather condition may incorporate how the significant weather condition varies over altitude as well as latitude and longitude. EFB 310 may also show the graphical display of the significant weather condition with an extended range, at a long range from a current position of aircraft 138, which may incorporate data from multiple sources and may be longer range than the maximum range of onboard weather radar system 250 or other sensors 272 of aircraft 138. This extended range may assist the crew of aircraft 138 in evaluating any potential changes in flight path over long distances and potentially well ahead of time, which may enable a high number of options in potential changes to a flight plan. EFB 310 may also show time-lapse animations of the significant weather condition at a high frame rate, which may also assist the crew in evaluating whether a change in the flight path might be required or how a change in the flight path might help in avoiding the significant weather condition.

The amount of data required for a high-resolution, long range, three-dimensional, high frame rate graphical display of the significant weather condition as incorporated in the secondary data stream transmitted from hub station 110 to aircraft 138 may be substantial, and may impose a substantial or expensive burden on the telecommunications or bandwidth resources of aircraft 138 and/or hub station 110. Various systems of this disclosure may enable only activating and imposing the high bandwidth needed for such a high-resolution, long range, three-dimensional, high frame rate graphical display of the significant weather condition only at such times as it is needed and beneficial for the crew of aircraft 138 in evaluating and planning whether or how to vary their flight plan on account of a significant weather condition.

Figure 4:
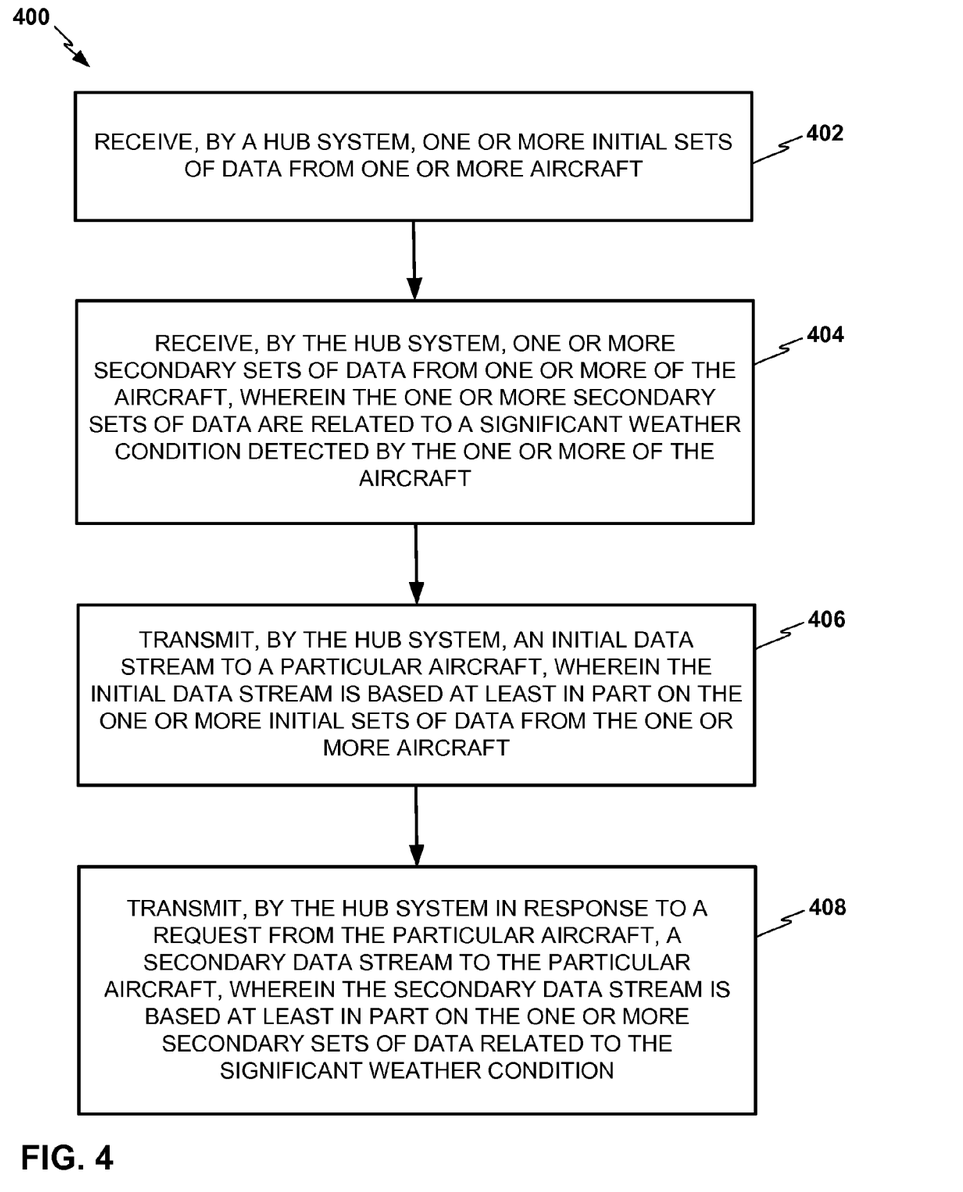
FIG. 4 shows a flowchart for an example method for enabling an onboard weather display system with managed bandwidth between a hub system and an aircraft in flight.

FIG. 4 shows a flowchart for an example method 400 for enabling an onboard weather display system with managed bandwidth between a hub system and an aircraft in flight, in accordance with illustrative aspects of this disclosure. Method 400 includes receiving, by a hub system (e.g., hub system 110), one or more initial sets of data from one or more aircraft (e.g., aircraft 132, 134, 136) (402). Method 400 further includes receiving, by the hub system, one or more secondary sets of data from one or more of the aircraft, wherein the one or more secondary sets of data are related to a significant weather condition detected by the one or more of the aircraft (404). Method 400 further includes transmitting, by the hub system, an initial data stream to a particular aircraft (e.g., aircraft 138), wherein the initial data stream is based at least in part on the one or more initial sets of data from the one or more aircraft (406). Method 400 further includes transmitting, by the hub system in response to a request from the particular aircraft, a secondary data stream to the particular aircraft, wherein the secondary data stream is based at least in part on the one or more secondary sets of data related to the significant weather condition (408).

Figure 5:
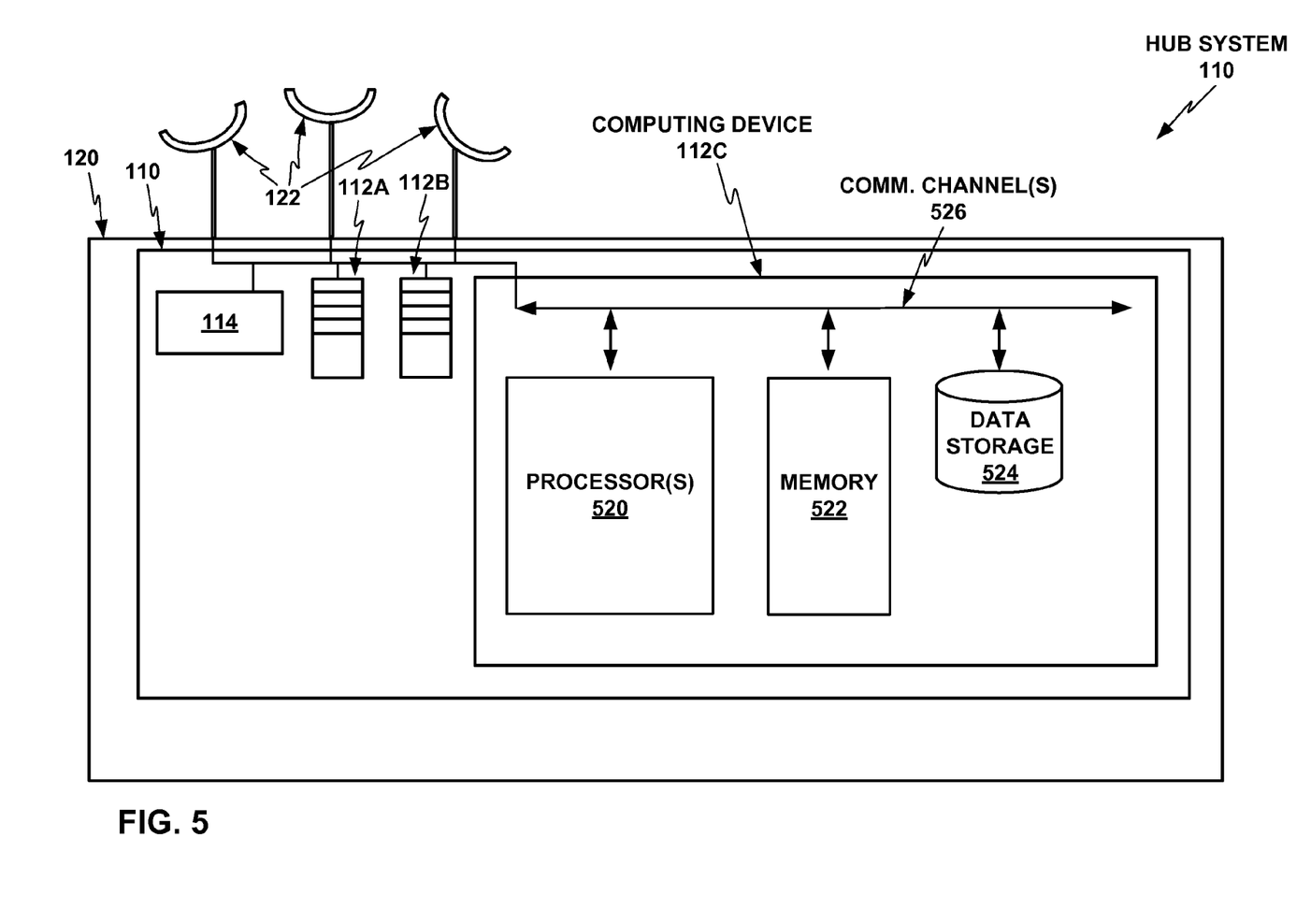
FIG. 5 depicts a block diagram of an example hub system for enabling an onboard weather display system with managed bandwidth.

FIG. 5 depicts a block diagram of a hub system 110 for enabling an onboard weather display system with managed bandwidth in accordance with an illustrative example. As described above with reference to FIG. 1, hub system 110 includes computing devices 112A, 112B, 112C ("computing devices 112") and an interface device 114 in data communication with computing devices 112, in this example. Hub system 110 is also in data communication with communication antennas 122 of ground station 120. Representative computing device 112C includes one or more processor(s) 520, memory 522, and data storage 524. Processor(s) 520 are configured to receive the one or more initial sets of data from one or more of aircraft 132, 134, and 136, and to generate the initial data stream based on the initial sets of data for transmitting to aircraft 138. Processor(s) 520 are further configured to receive the one or more secondary sets of data from one or more of aircraft 132, 134, and 136, and to generate the secondary data stream based on the secondary sets of data for transmitting to aircraft 138.

Elements of hub system 110 as disclosed above may be implemented in any of a variety of additional types of solid state circuit elements, such as central processing units (CPUs), application-specific integrated circuits (ASICs), a magnetic nonvolatile random-access memory (RAM) or other types of memory, a mixed-signal integrated circuit, a field programmable gate array (FPGA), a microcontroller, a programmable logic controller (PLC), a system on a chip (SoC), a subsection of any of the above, an interconnected or distributed combination of any of the above, or any other type of component or one or more components capable of being configured in accordance with any of the examples disclosed herein. Elements of hub system 110 may be programmed with various forms of software. Elements of hub system 110 as in any of the examples herein may be implemented as a device, a system, an apparatus, and may embody or implement a method of implementing hybrid radar, including for implementing example method 400 as described with reference to FIG. 4.

The techniques of this disclosure may be implemented in a wide variety of computing devices. Any components, modules or units have been described provided to emphasize functional aspects and does not necessarily require realization by different hardware units. The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset.

As mentioned above, the techniques of this disclosure may also be implemented on an article of manufacture comprising a computer-readable storage medium. The term "processor," as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the devices described herein may define a specific machine that is capable of executing the specific functions described herein. Also, the techniques could be fully implemented in one or more circuits or logic elements, which could also be considered a processor.

Various illustrative aspects of the disclosure are described above. These and other aspects are within the scope of the following claims.

What is claimed is:

1. A method comprising:

receiving, by a hub system, one or more initial sets of data from a first set of one or more aircraft;

receiving, by the hub system, one or more secondary sets of data from a second set of one or more aircraft from among the first set of one or more aircraft, wherein the one or more secondary sets of data are related to a significant weather condition detected by the second set of one or more aircraft;

transmitting, by the hub system, an initial data stream to a particular aircraft, wherein the initial data stream is based at least in part on the one or more initial sets of data; and transmitting, by the hub system in response to a request from the particular aircraft, a secondary data stream at a higher bandwidth than the initial data stream to the particular aircraft, wherein the secondary data stream is based at least in part on the one or more secondary sets of data related to the significant weather condition.

2. The method of claim 1, wherein receiving the one or more initial sets of data from one or more aircraft comprises receiving one or more of sensor data, sensor range setting data, sensor angle setting data, aircraft position data, aircraft heading data, aircraft speed data, aircraft altitude data, or timestamp data, from the one or more aircraft, and
wherein transmitting, to the particular aircraft, the initial data stream based at least in part on the one or more initial sets of data from the one or more aircraft comprises transmitting one or more of the sensor data, the sensor range setting data, the sensor angle setting data, the aircraft position data, the aircraft heading data, the aircraft speed data, the aircraft altitude data, or the timestamp data, from the one or more aircraft.

3. The method of claim 2, wherein the sensor data comprises imaging data from an onboard weather radar, and the sensor range setting data and the sensor angle setting data comprise range and angle settings, respectively, for the onboard weather radar.

4. The method of claim 1, wherein receiving the one or more secondary sets of data comprises receiving, by the hub system, the one or more secondary sets of data at a higher bandwidth than the one or more initial sets of data.

5. The method of claim 1, further comprising:
generating the secondary data stream based at least in part on the one or more secondary sets of data related to the significant weather condition, prior to transmitting the secondary data stream, wherein generating the secondary data stream comprises processing the one or more secondary sets of data related to the significant weather condition.

6. The method of claim 5, wherein the one or more secondary sets of data comprise weather radar data from the second set of one or more aircraft, and processing the one or more secondary sets of data related to the significant weather condition comprises processing the weather radar data from the second set of one or more aircraft for a high-resolution graphical display of the significant weather condition, wherein the high-resolution graphical display has a resolution above a selected resolution threshold.

7. The method of claim 6, wherein the format enabled for the high-resolution graphical display of the significant weather condition is further enabled for one or more of:
display in a three-dimensional (3D) view; display at a high frame rate, wherein the high frame rate has a frame rate above a selected frame rate threshold; display covering a long range, wherein the long range has a range above a selected distance threshold; or display at various points in time as determined by a position of a user input element.

8. The method of claim 1, further comprising:
selecting, from the one or more of the aircraft from which the one or more secondary sets of data related to the significant weather condition are received, one or more aircraft based at least in part on the aircraft being within a selected range of a nominal flight path of the particular aircraft from which the request is received; and
generating the secondary data stream based on the secondary sets of data related to the significant weather condition from the one or more selected aircraft, and omitting data received from one or more of the aircraft that are not within the selected range of the nominal flight path of the particular aircraft from which the request is received.

9. The method of claim 1, wherein the request from the particular aircraft designates one or more of the aircraft from which the one or more secondary sets of data related to the significant weather condition are received, the method further comprising:
generating the secondary data stream based on the secondary sets of data related to the significant weather condition from the one or more designated aircraft, and omitting data received from one or more of the aircraft that are not designated in the request from the particular aircraft.

10. The method of claim 1, further comprising:
receiving additional data related to the significant weather condition from one or more additional sensor systems; and
generating the secondary data stream based at least in part on both the additional data related to the significant weather condition from the one or more additional sensor systems, and the one or more secondary sets of data received from the one or more of the aircraft.

11. The method of claim 10, wherein the one or more additional sensor systems comprise at least one of one or more weather satellites or one or more ground radar systems.

12. The method of claim 1, wherein the one or more secondary sets of data include additional types of data not comprised in the initial sets of data.

13. The method of claim 12, wherein the additional types of data comprise three-dimensional radar imaging data related to the significant weather condition.

14. The method of claim 1, further comprising:
confirming a subscriber policy associated with the particular aircraft; and
establishing a high-bandwidth data link with the particular aircraft, prior to transmitting the secondary data stream to the particular aircraft, wherein the high-bandwidth data link has a bandwidth higher than a selected nominal bandwidth.

15. An article of manufacture comprising a computer-readable medium having program code stored thereon, configured to be executable by one or more processors for causing the one or more processors to:
receive one or more initial sets of data from one or more aircraft;
receive one or more secondary sets of data from one or more of the aircraft, wherein the one or more secondary sets of data are related to a significant weather condition detected by the one or more of the aircraft;
generate an initial data stream for transmission to a particular aircraft, wherein the initial data stream is based at least in part on the one or more initial sets of data from the one or more aircraft; and
generate, in response to a request from the particular aircraft, a secondary data stream for transmission to the particular aircraft at a higher bandwidth than the initial data stream, wherein the secondary data stream is based at least in part on the one or more secondary sets of data related to the significant weather condition.

16. The article of manufacture of claim 15, wherein the program code is further configured for causing the one or more processors to:
generate the secondary data stream based at least in part on the one or more secondary sets of data related to the significant weather condition, prior to transmitting the secondary data stream, wherein generating the secondary data stream comprises processing the one or more secondary sets of data related to the significant weather condition.

17. The article of manufacture of claim 15, wherein the one or more secondary sets of data comprise weather radar data from the one or more of the aircraft, and wherein processing the one or more secondary sets of data related to the significant weather condition comprises processing the weather radar data from the one or more of the aircraft for a high-resolution graphical display of the significant weather condition, wherein the high-resolution graphical display has a resolution above a selected resolution threshold.

18. A system for operating an onboard weather display system on an aircraft, the system comprising a processor configured to:
- receive an initial data stream based at least in part on one or more initial sets of data from one or more additional aircraft;
- transmit a request to a hub system for a secondary data stream comprising additional data associated with a significant weather condition indicated by the initial data stream;
- receive the secondary data stream at a higher bandwidth than the initial data stream, wherein the secondary data stream comprises additional data not comprised in the initial data stream; and
- generate a display based at least in part on the secondary data stream.

19. The system of claim 18, wherein the processor is further configured to generate the display based at least in part on the secondary data stream by at least generating a high-resolution graphical display of the significant weather condition based at least in part on the secondary data stream, wherein the high-resolution graphical display has a resolution above a selected resolution threshold.

20. The system of claim 18, wherein the processor is further configured to generate the high-resolution graphical display of the significant weather condition based at least in part on the secondary data stream by at least generating the high-resolution graphical display of the significant weather condition in a three-dimensional (3D) view and at a high frame rate, wherein the high frame rate has a frame rate above a selected frame rate threshold.

21. A hub system configured to enable an onboard weather display system on an aircraft, the hub system comprising:
- means for receiving one or more initial sets of data from one or more aircraft;
- means for receiving one or more secondary sets of data from one or more of the aircraft, wherein the one or more secondary sets of data are related to a significant weather condition detected by the one or more of the aircraft;
- means for transmitting an initial data stream to a particular aircraft, wherein the initial data stream is based at least in part on the one or more initial sets of data from the one or more aircraft; and
- means for transmitting, in response to a request from the particular aircraft, a secondary data stream at a higher bandwidth than the initial data stream to the particular aircraft, wherein the secondary data stream is based at least in part on the one or more secondary sets of data related to the significant weather condition.

22. The hub system of claim 21, further comprising:
- means for generating the secondary data stream based at least in part on the one or more secondary sets of data related to the significant weather condition, prior to transmitting the secondary data stream, wherein generating the secondary data stream comprises processing the one or more secondary sets of data related to the significant weather condition, and
- wherein the one or more secondary sets of data comprise weather radar data from the one or more of the aircraft, and processing the one or more secondary sets of data related to the significant weather condition comprises processing the weather radar data from the one or more of the aircraft for a high-resolution graphical display of the significant weather condition, wherein the high-resolution graphical display has a resolution above a selected resolution threshold.

\* \* \* \* \*